United States Patent Office 3,743,734
Patented July 3, 1973

---

3,743,734
PHARMACEUTICAL COMPOSITIONS COMPRISING AN 11 - AMINOACETYL - 5,11 - DIHYDRO-6H-PYRIDO[2,3-b][1,4]BENZODIAZEPIN-6-ONE
Gunther Schmidt, Robert Engelhorn, and Matyas Leitold, Biberach (Riss), Germany, assignors to Boehringer Ingelheim G.m.b.H., Ingelheim am Rhein, Germany
No Drawing. Original application Aug. 7, 1969, Ser. No. 848,345, now Patent No. 3,660,380. Divided and this application Feb. 9, 1972, Ser. No. 224,974
Claims priority, application Germany, Aug. 20, 1968, P 17 95 183.6
Int. Cl. A61k 27/00
U.S. Cl. 424—250  11 Claims

ABSTRACT OF THE DISCLOSURE

Pharmaceutical compositions containing as an active ingredient an 11 - aminoacetyl - 5,11 - dihydro-6H-pyrido [2,3-b][1,4]benzodiazepin-6-one of the formula

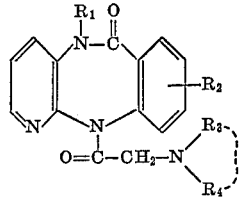

wherein $R_1$ is hydrogen or alkyl of 1 to 4 carbon atoms,
$R_2$ is hydrogen, halogen or methyl, and
$R_3$ and $R_4$ are each straight or branched alkyl of 1 to 5 carbon atoms or, together with each other and the nitrogen atom to which they are attached, camphidino or a 5- to 7-membered saturated monocyclic heterocyclic ring which may optionally comprise an oxygen or another nitrogen ring atom and/or may optionally have an alkyl of 1 to 4 carbon atoms, hydroxy-alkyl of 1 to 4 carbon atoms, benzyl or methyl-benzyl substituent attached to a ring atom, or a non-toxic, pharmacologically acceptaable acid addition salt thereof; the compositions are effective inhibitors of stomach ulcers and stomach juice secretion, as well as antitussives and antiemetics.

---

This is a division of copending application Ser. No. 848,345 filed Aug. 7, 1969, now U.S. Pat. 3,660,380.

This invention relates to novel pharmaceutical compositions comprising as an active ingredient an 11-aminoacetyl-5,11-dihydro-6H-pyrido[2,3-b][1,4]benzodiazepin-6-one or a non-toxic acid addition salt thereof, as well as to a method using such compositions as inhibitors of stomach ulcers and stomach juice secretion, antitussives and antiemetics.

More particularly, the present invention relates to pharmaceutical compositions comprising as an active ingredient a compound of the formula

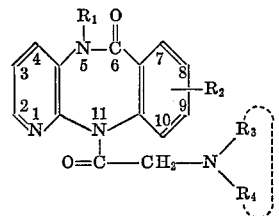

(I)

wherein $R_1$ is hydrogen or alkyl of 1 to 4 carbon atoms,
$R_2$ is hydrogen, halogen or methyl, and $R_3$ and $R_4$ are each straight or branched alkyl of 1 to 5 carbon atoms or, together with each other and the nitrogen atom to which they are attached, camphidino or a 5- to 7-membered saturated monocyclic heterocyclic ring which may optionally comprise an oxygen or another nitrogen ring atom and/or may optionally have an alkyl or 1 to 4 carbon atoms, hydroxy-alkyl of 1 to 4 carbon atoms, benzyl or methyl-benzyl substituent attached to a ring atom, or a non-toxic, pharmacologically acceptable acid addition salt thereof.

The compounds of the Formula I above may be prepared by reacting an 11-haloacetyl-5,11-dihydro-6H-pyrido [2,3-b][1,4]benzodiazepin-6-one of the formula

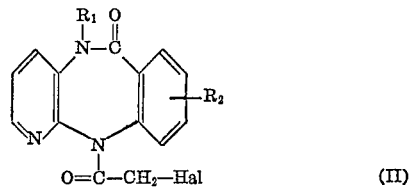

(II)

wherein $R_1$, $R_2$ and $R_3$ have the same meanings as in Formula I and Hal is halogen, with a secondary amine of the formula

(III)

wherein $R_3$ and $R_4$ have the same meanings as in Formula I, in accordance with known methods.

The reaction is advantageously carried out in the presence of an inert organic solvent at elevated temperatures, preferably at the boiling point of the particular solvent which is employed. Preferred solvents are ethanol, acetone and dioxane; however, aromatic hydrocarbons, such as benzene or toluene, may also be used. The reaction may also optionally be carried out in the presence of an acid-binding agent, i.e. a compound which is capable of tying up or neutralizing the hydrogen halide released by the reaction but does not participate in the reaction itself, such as an alkali metal carbonate or alkali metal bicarbonate. Moreover, if the secondary amine of the Formula III is provided in sufficient excess over the amount required for reaction with the dibenzodiazepinone of the Formula II, the excess amine may itself act as the acid-binding agent, so that the addition af a separate acid-binding agent is not necessary. If the amine of the Formula III is a highly volatile compound, the reaction may optionally be carried out in a closed vessel.

In order to shorten the reaction period and lower the reaction temperature, it is in some cases advantageous to start with a compound of the Formula II wherein Hal is iodine; such iodoacetyl compounds may most conveniently be prepared by reacting the corresponding chloroacetyl compound with sodium iodide in acetone, pursuant to known methods.

In the preparation of a compound of the Formula I wherein the amino radical attached to the 5-acetyl substituent is unsubstituted piperazino, it is advantageous to prepare first a compound of the Formula I wherein the said amino moiety is 4'-aralkyl-piperazino, and thereafter hydrogenate this compound pursuant to known methods, such as with hydrogen in the presence of palladized activated charcoal, to remove the aralkyl substituent.

The compounds embraced by Formula I are organic bases and therefore form acid addition salts with inorganic or organic acids. If desired, a compound of the Formula I may be converted into an acid addition salt thereof by known methods, such as by dissolving the free base in a solvent, and acidifying the solution with the desired acid. Examples of non-toxic, pharmacologically acceptable acid addition salts are those formed with hydrochloric acid, hydrobromic acid, sulfuric acid, phosphoric acid, tartaric acid, fumaric acid, citric acid, maleic acid, succinic acid, oxalic acid, 8-chlorotheophylline or the like.

The starting compounds of the Formula II, which are also novel, may be prepared by methods analogous to those described in the literature, namely, for instance, by reacting a 5,11-dihydro-6H-pyrido[2,3-b][1,4]benzodiazepin-6-one of the formula

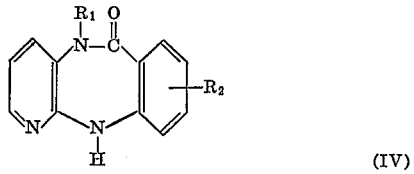

(IV)

wherein $R_1$ and $R_2$ have the same meanings as in Formula I, with a haloacetyl halide of the formula

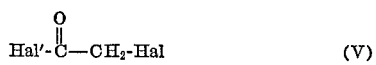

(V)

wherein Hal and Hal', which may be identical to or different from each other, are each chlorine, bromine, or iodine. The reaction is preferably carried out in the presence of an inert organic solvent and of a hydrogen halide-binding agent at elevated temperatures, most advantageously at the boiling point of the particular solvent which is employed. Examples of suitable solvents are aromatic hydrocarbons, such as benzene, toluene or xylene; alicyclic ethers, such as diethyl ether or dipropyl ether; or cyclic ethers, such as dioxane. Examples of suitable hydrogen halide-binding agents are tertiary organic bases, such as triethylamine, N,N-dimethylaniline, pyridine or the like; or also inorganic bases, such as alkali metal or alkaline earth metal carbonates or bicarbonates.

The haloacetyl compound of the Formula II formed thereby are in most instances well crystallizable substances which can be used as raw products without further purification for conversion into the corresponding compounds of the Formula I.

A compound of the Formula IV may, in turn, be prepared by the methods described in German Patents 1,179,943 and 1,204,680, for example.

The following examples illustrate the preparation of various starting compounds of the Formula II as well as end products of the Formula I.

PREPARATION OF STARTING COMPOUNDS OF THE FORMULA II

Example A.—11-chloroacetyl-5,11-dihydro-6H-pyrido[2,3-b][1,4]benzodiazepin-6-one 48.4 gm. of 5,11-dihydro-6H-pyrido[2,3-b][1,4]benzodiazepin-6-one were refluxed in 900 ml. of absolute dioxane for 15 minutes. Thereafter, over a period of 45 minutes, 28 ml. of chloroacetyl chloride and 52 ml. of triethylamine were simultaneously added dropwise to the mixture. The mixture was refluxed for eight hours and then vacuum-filtered after having cooled. The filtrate was evaporated in vacuo. The crystalline residue was recrystallized from acetonitrile in the presence of activated charcoal. M.P. 212–213° C. (decomposition). Yield: 85% of theory.

Example B.—11-chloroacetyl-5,11-dihydro-5-methyl-6H-pyrido[2,3-b][1,4]benzodiazepin-6-one A mixture of 9.0 gm. (0.04 mol) of 5,11-dihydro-5-methyl-6H-pyrido]2,3-b][1,4]benzodiazepin-6 - one, 4.0 gm. (0.04 mol) of triethylamine and 300 ml. of absolute benzene was heated to the boiling point. 8.8 gm. (0.08 mol) of chloroacetyl chloride were added dropwise over a period of ten minutes, and the mixture was refluxed for three hours. The reaction mixture was vacuum-filtered while still hot, and the filtrate was evaporated in vacuo. The residue was recrystallized from ethanol. M.P. 203–205° C. (decomposition). Yield: 80% of theory.

Example C.—8-chloro-11-chloroacetyl-5,11-dihydro-6H-pyrido[2,3-b][1,4]benzodiazepin-6-one A mixture of 4.8 gm. of 8-chloro-5,11-dihydro-6H-pyrido[2,3-b][1,4]benzodiazepin-6-one and 100 ml. of absolute dioxane was heated to boiling, and then 2.4 ml. of chloroacetylchloride and 4.5 ml. of triethylamine were added dropwise simultaneously. After six hours' heating, the reaction mixture was worked up as described in Example A. The reaction product was recrystallized from ethanol. M.P. 211–212° C. (decomposition). Yield: 65% of theory.

Example D.—9-chloro-11-chloroacetyl-5,11-dihydro-6H-pyrido[2,3-b][1,4]benzodiazepin-6-one 24.5 gm. of 9-chloro-5,11-dihydro-6H-pyrido[2,3-b][1,4]benzodiazepin-6-one were reacted in 500 ml. of absolute dioxane with 12 ml. of chloroacetyl chloride and 22.5 ml. of triethylamine, as described in Example C. After the reaction had gone to completion, the reaction mixture was vacuum-filtered while still hot, the filter cake was washed with water, and the residue was recrystallized from dimethylformamide. M.P. 223–225° C. (decomposition). Yield: 25% of theory.

Example E.—5-ethyl-11-chloroacetyl-5,11-dihydro-6H-pyrido[2,3-b][1,4]benzodiazepin-6-one A mixture of 12.0 gm. of 5-methyl-5,11-dihydro-6H-pyrido[2,3-b][1,4]benzodiazepin-6-one, 7.3 gm. of N,N-dimethylaniline and 200 ml. of absolute dioxane was heated to the boiling point, and then 6.7 gm. of chloroacetyl chloride were added dropwise over a period of ten minutes. The mixture was refluxed for 4.5 hours, and after it had cooled, 1 liter of water was poured in. The substance initially separating out as an oil became crystalline and was then vacuum-filtered off. M.P. 169–170° C. Yield: 60% of theory.

Example F.—11-chloroacetyl-5,11-dihydro-8-methyl-6H-pyrido[2,3-b][1,4]benzodiazepin-6-one From 5,11-dihydro-8-methyl-6H - pyrido[2,3 - b][1,4] benzodiazepin-6-one, chloroacetyl chloride and dimethylaniline in absolute dioxane, analogous to the manner described in Example E. M.P. 120–124° C. (from ethanol). Yield: 55% of theory.

PREPARATION OF END PRODUCTS OF THE FORMULA I

Example 1.—11-diethylaminoacetyl-5,11-dihydro-6H-pyrido[2,3-b][1,4]benzodiazepin-6-one A mixture of 5.0 gm. (0.0174 mol) of 11-chloroacetyl-5,11-dihydro-6H-pyrido[2,3 - b][1,4]benzodiazepin-6-one (prepared as described in Example A), 2.55 gm. (0.0358 mol) of diethylamine and 200 ml. of absolute benzene was refluxed for 70 hours. Thereafter, the solvent was distilled off in vacuo, and the residue was recrystallized from cyclohexane, yielding 54% of theory of the compound, M.P. 152–153° C., of the formula

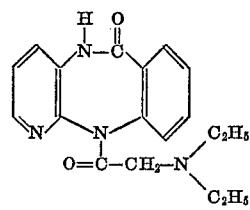

Analysis.—$C_{18}H_{20}N_4O_2$; mol. wt. 324.4. Calculated (percent): C, 66.64; H, 6.21; N, 17.27. Found (percent): C, 66.60; H, 6.39; N, 17.24.

Example 2.—11-diethylaminoacetyl-5,11-dihdro-5-methyl-6H-pyrido[2,3-b][1,4]benzodiazepin-6-one A mixture of 9.5 gm. (0.0316 mol) of 11-chloroacetyl-5,11-dihydro-5-methyl-6H-pyrido[2,3 - b][1,4]benzodiazepin-6-one (prepared according to Example B), 4.6 gm. (0.0632 mol) of diethylamine and 300 ml. of absolute benzene was refluxed for 15 hours. Thereafter, the solvent was distilled off in vacuo, and the residue was recrystallized from isopropanol, yielding 30% of theory of the compound, M.P. 137–138° C., of the formula

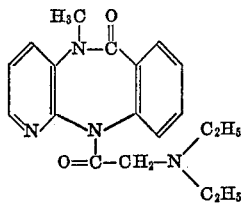

*Analysis.*—$C_{19}H_{22}N_4O_2$; mol. wt. 338.4. Calculated (percent): C, 67.43; H, 6.55; N, 16.56. Found (percent): C, 67.35; H, 6.68; N, 16.75.

Example 3.—5,11-dihydro-11-[(di-n-propylamino)-acetyl]-6H-pyrido[2,3-b][1,4]benzodiazepine-6-one A mixture of 4.2 gm. of 11-chloroacetyl-5,11-dihydro-6H-pyrido[2,3-b][1,4]benzodiazepin-6-one, 15 ml. of di-n-propylamine and 100 ml. of ethanol was refluxed for 18 hours. Thereafter, the solvent was distilled off in vacuo, the residue was dissolved in dilute hydrochloric acid, the solution was washed with chloroform and made alkaline with potassium hydroxide. The alkaline solution was extracted with methylene chloride, the organic phase was evaporated in vacuo, and the residue was recrystallized from isopropanol, yielding 30% of theory of the desired reaction product, M.P. 212–213° C.

*Analysis.*—$C_{20}H_{24}N_4O_2$; mol. wt. 352.4. Calculated (percent): C, 68.16; H, 6.86; N, 15.90. Found (percent): C, 68.50; H, 6.94; N, 15.95.

Example 4.—11-[(di-n-butylamino)-acetyl]-5,11-dihydro-6H-pyrido[2,3-b][1,4]benzodiazepin-6-one A mixture of 6.3 gm. of 11-chloroacetyl-5,11-dihydro-6H-pyrido[2,3-b][1,4]benzodiazepin-6-one, 30 ml. of di-n-butylamine and 150 ml. of ethanol was heated at 80° C. in an autoclave for 18 hours. Thereafter, the mixture was worked up as described in Example 3. After recrystallization from ethanol, the reaction product had a melting point of 177–179° C. Yield: 33% of theory.

*Analysis.*—$C_{22}H_{28}N_4O_2$; mol. wt. 380.5. Calculated (percent): C, 69.45; H, 7.42; N, 14.72. Found (percent): C, 69.50; H, 7.50; N, 14.70.

Example 5.—5,11-dihydro-11-diisobutylaminoacetyl-6H-pyrido[2,3-b][1,4]benzodiazepin-6-one A mixture of 4.2 gm. of 11-chloroacetyl-5,11-di-hydro-6H-pyrido[2,3-b][1,4]benzodiazepin-6-one, 15 ml. of di-iso-butylamine and 150 ml. of ethanol was refluxed for 18 hours, and the reaction mixture was worked up as described in Example 3. After recrystallization from isopropanol the reaction product had a melting point of 226–227° C.; yield: 37% of theory.

*Analysis.*—$C_{22}H_{28}N_4O_2$; mol. wt. 380.5. Calculated (percent): C, 69.45; H, 7.42; N, 14.72. Found (percent): C, 69.25; H, 7.38; N, 14.72.

Example 6.—5,11-dihydro-11-[(di-n-pentylamino)-acetyl]-6H-pyrido[2,3-b][1,4]benzodiazepin-6-one A mixture of 4.2 gm. of 11-chloroacetyl-5,11-di-hydro-6H-pyrido[2,3-b][1,4]benzodiazepin-6-one, 15 ml. of di-n-pentylamine and 100 ml. of ethanol was refluxed for 18 hours, and the reaction mixture was worked up as described in Example 3. After recrystallization from ethylene chloride/gasoline the reaction product had a melting point of 157–158° C. Yield: 35% of theory.

*Analysis.*—$C_{24}H_{32}N_4O_2$; mol. wt. 408.6. Calculated (percent): C, 70.56; H, 7.89; N, 13.72. Found (percent): C, 70.80; H, 7.81; N, 13.68.

Example 7.—5,11-dihydro-11-piperidinoacetyl-6H-pyrido[2,3-b][1,4]benzodiazepin-6-one A mixture of 4.0 gm. of 11-chloroacetyl-5,11-di-hydro-6H-pyrido[2,3-b][1,4]benzodiazepin-6-one, 2.55 gm. of piperidine and 100 ml. of absolute benzene was refluxed for 28 hours. Thereafter, the solvent was distilled off, and the residue was recrystallized from ethanol, yielding 43% of theory of the compound, M.P. 217–218° C., of the formula

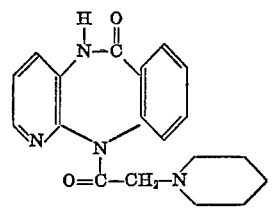

*Analysis.*—$C_{19}H_{20}N_4O_2$; mol. wt. 336.4. Calculated (percent): C, 67.84; H, 5.99; N, 16.69. Found (percent): C, 67.95; H, 6.19; N, 16.80.

Example 8.—5,11-dihydro-11[(4'-methyl-1'-piperazinyl)-acetyl]-6H-pyrido[2,3-b][1,4]benzodiazepin-6-one and its dihydrochloride A mixture of 67.5 gm. of 11-chloroacetyl-5,11-dihydro-6H-pyrido[2,3-b][1,4]benzodiazepin-6-one, 183 ml. of N-methyl-piperazine and 1.37 liters of absolute benzene was refluxed for 18 hours. Thereafter, the crystalline precipitate was vacuum filtered off, dissolved in aqueous 20% hydrochloric acid, the solution was evaporated in vacuo, the crystalline residue was dissolved in 250 ml. of water while heating, the solution was admixed with 150 ml. of isopropanol and active charcoal, filtered, and 2.5 liters of isopropanol were added to the filtrate. After cooling, the precipitate was vacuum filtered off, yielding 70% of theory of the dihydrochloride, M.P. 257–259° C. (decomp.), of the formula

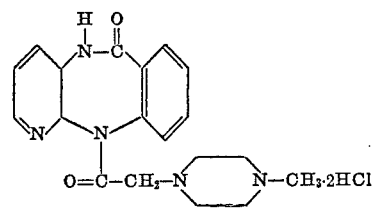

*Analysis.*—$C_{19}H_{23}Cl_2N_5O_2$; mol. wt. 424.4. Calculated (percent): C, 53.78; H, 5.47; N, 16.50; Cl, 16.71. Found (percent): C, 53.50; H, 5.49; N, 16.25; Cl, 16.70.

The free base, obtained from the dihydrochloride by making an aqueous solution thereof alkaline with dilute sodium hydroxide and extracting it with chloroform, melted at 226–228° C. after recrystallization from methanol/ether.

*Analysis.*—$C_{19}H_{21}N_5O_2$; mol. wt. 351.4. Calculated (percent): C, 64.94; H, 6.02; N, 19.93. Found (percent): C, 64.50; H, 6.29; N, 19.90.

The fumarate with 1½ mols of fumaric acid per 1 mol base melted at 219–220° C. (decomposition).

Example 9.—5,11 - dihydro-5-methyl-11-[(4'-methyl-1'-piperazinyl) - acetyl] - 6H - pyrido[2,3-b][1,4]benzodiazepin-6-one dihydrochloride A mixture of 5.0 gm. of 11-chloroacetyl-5,11-dihydro-5-methyl-6H-pyrido[2,3-b][1,4]benzodiazepin-6-one (prepared according to Example B), 15 ml. of N-methyl-piperazine and 200 ml. of absolute dioxane was refluxed for 18 hours. Thereafter, the mixture was evaporated in vacuo, the residue was dissolved in aqueous 20% hydrochloric acid, and the solution was worked up as described in Example 8. The dihydrochloride melted at 227° C. (decomp.) after recrystallization from aqueous isopropanol. Yield: 40% of theory.

Analysis.—Dihydrochloride: $C_{20}H_{25}Cl_2N_5O_2$; mol. wt. 438.4. Calculated (percent): C, 54.80; H, 5.75; N, 15.97; Cl, 16.18. Found (percent): C, 54.50; H, 5.88; N, 15.70; Cl, 16.25.

Example 10.—8 - chloro-5,11-dihydro-11-[(4'-methyl-1'-piperazinyl) - acetyl] - 6H - pyrido[2,3-b][1,4]benzodiazepin-6-one 7.3 gm. of 8 - chloro-11-chloroacetyl-5,11-dihydro-6H-pyrido[2,3-b][1,4]benzodiazepin-6-one (prepared according to Example C) and 15 ml. of N-methylpiperazine were reacted in 200 ml. of absolute ethanol in a manner analogous to that described in Example 3 and worked up accordingly. The reaction product melted at 254–256° C. (decomposition) after recrystallization from ethanol. Yield: 56% of theory.

Analysis.—$C_{19}H_{20}ClN_5O_2$; mol. wt. 385.9. Calculated (percent): C, 59.14; H, 5.23; N, 18.15; Cl, 9.19. Found (percent): C, 59.20; H, 5.23; N, 18.25; Cl, 9.12.

Example 11.—9-chloro-5,11-dihydro - 11 - [(4'-methyl-1'-piperazinyl) - acetyl] - 6H - pyrido[2,3-b][1,4]benzodiazepin-6-one dihydrochloride 3.0 gm. of 9-chloro-11-chloroacetyl-5,11-dihydro-6H-pyrido[2,3-b][1,4]benzodiazepin-6-one (prepared according to Example D) and 10 ml. of N-methylpiperazine were reacted in 100 ml. of ethanol by the method described in Example 9, and the reaction mixture was worked up accordingly. After recrystallization from ethanol the dihydrochloride had a melting point of 205–207° C. (decomposition). Yield: 36% of theory.

Analysis.—Dihydrochloride: $C_{19}H_{22}Cl_3N_5O_2$; mol. wt. 458.8. Calculated (percent): C, 49.74; H, 4.83; N, 15.26; Cl, 23.20. Found (percent): C, 49.20; H, 5.08; N, 15.30; Cl, 22.60.

Example 12.—5,11-dihydro - 11 - [(4'-(β-hydroxyethyl)-1'-piperazinyl)-acetyl] - 6H - pyrido[2,3-b][1,4]benzodiazepin-6-one 8.6 gm. of 11-chloroacetyl-5,11-dihydro-6H-pyrido[2,3-b][1,4]benzodiazepin-6-one and 25 ml. of N-(β-hydroxyethyl)-piperazine were reacted in 300 ml. of ethanol as described in Example 3, and worked up accordingly. After recrystallization from isopropanol/cyclohexane, 25% of theory of the compound, M.P. 213–214° C., of the formula

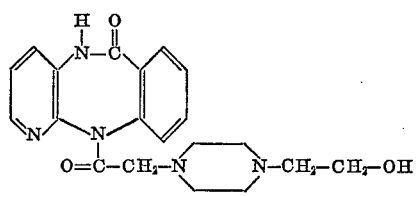

were obtained.

Analysis.—$C_{20}H_{23}N_5O_3$; mol. wt. 381.4. Calculated (percent): C, 62.98; H, 6.08; N, 18.36. Found (percent): C, 63.00; H, 6.04; N, 18.35.

Example 13.—5,11 - dihydro - 11 - [(4'-benzyl-1'-piperazinyl)-acetyl] - 6H - pyrido[2,3-b][1,4]benzodiazepin-6-one A mixture of 4.2 gm. of 11-chloroacetyl-5,11-dihydro-6H-pyrido[2,3-b][1,4]benzodiazepin-6-one, 8 gm. of N-benzylpiperazine and 200 ml. of absolute benzene was refluxed for 18 hours. The cooled solution was admixed with ethanol, made alkaline with concentrated ammonia, and evaporated in vacuo. The residue was recrystallized from isopropanol/water, yielding 40% of theory of the compound, M.P. 216–217° C., of the formula

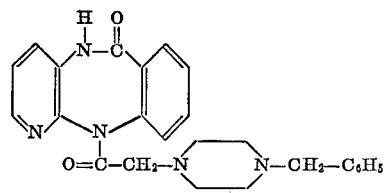

Analysis.—$C_{25}H_{25}N_5O_2$; mol. wt. 427.5. Calculated (percent): C, 70.24; H, 5.89; N, 16.38. Found (percent): C, 70.45; H, 6.05; N, 16.36.

Example 14.—5,11 - dihydro-11-[(4'1-(o-methylbenzyl)-1' - piperazinyl)-acetyl] - 6H - pyrido[2,3-b][1,4]benzodiazepin-6-one 6.8 gm. of 11-chloroacetyl - 5,11 - dihydro-6H-pyrido[2,3-b][1,4]benzodiazepin - 6 - one and 10.0 gm. of N-(o-methylbenzyl)-piperazine were reacted in 300 ml. of absolute dioxane as described in Example 3, and worked up accordingly. After recrystallization from ethanol the reaction product melted at 218–220° C. (decomposition). Yield: 35% of theory of the compound of the formula

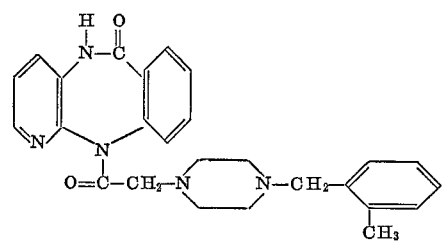

Analysis.—$C_{26}H_{27}N_5O_2$; mol. wt. 441.5. Calculated (percent): C, 70.73; H, 6.16; N, 15.85. Found (percent): C, 70.90; H, 6.23; N, 15.55.

Example 15.—5,11 - dihydro - 11 - [(1' - piperazinyl) acetyl] - 6H - pyrido[2,3 - b][1,4]benzodiazepin - 6-one dihydrochloride 10.0 gm. of 5,11-dihydro - 11 - [(4-benzyl-1-piperazinyl)-acetyl] - 6H - pyrido[2,3-b][1,4]benzodiazepin-6-one (prepared according to Example 13) were hydrogenated in the presence of 1 gm. of 10% palladized charcoal, 120 ml. of methanol and 3 drops of glacial acetic acid at 50° C. and 50 atmospheres. After eight hours the calculated quantity of hydrogen had been absorbed. After cooling, the reaction mixture was vacuum-filtered, and the filtrate was evaporated in vacuo. The residue, the raw free base, was dissolved in 20 ml. of isopropanol, and the solution was admixed with ethereal hydrochloric acid. The dihydrochloride which precipitated thereby was recrystallized from ethanol in the presence of activated charcoal, whereupon it had a melting point of 229–230° C. (decomposition). Yield: 30% of theory.

Analysis.—Dihydrochloride-hydrate: $C_{18}H_{23}Cl_2N_5O_3$; mol. wt. 428.3. Calculated (percent): C, 50.48; H, 5.41; N, 16.35; Cl, 16.55. Found (percent): C, 50.85; H, 5.16; N, 16.45; Cl, 16.10.

Example 16.—5,11-dihydro-11-pyrrolidinoacetyl-6H-pyrido[2,3-b][1,4]benzodiazepin-6-one A mixture of 4.2 gm. of 11-chloroacetyl-5,11-dihydro-6H-pyrido[2,3-b][1,4]benzodiazepin - 6 - one, 15 ml. of pyrolidine and 200 ml. of absolute benzene was refluxed for 18 hours. Thereafter, the hot reaction solution was admixed with animal charcoal and filtered, the filtrate was evaporated in vacuo, and the residue was recrystallized from isopropanol, yielding 50% of theory of the compound, M.P. 202–203° C., of the formula

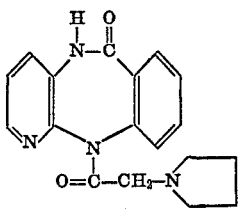

*Analysis.*—C₁₈H₁₈N₄O₂; mol. wt. 322.4. Calculated (percent): C, 67.07; H, 5.63; N, 17.38. Found (percent): C, 67.20; H, 5.72; N, 17.15.

Example 17.—5,11 - dihydro - 11 - [(4' - methylpiperidino)-acetyl] - 6H - pyrido[2,3-b][1,4]benzodiazepin-6-one 4.2 gm. of 11-chloroacetyl - 5,11 - dihydro-6H-pyrido[2,3-b][1,4]benzodiazepin - 6 - one and 15 ml. of 4-methylpiperidine were reacted in 200 ml. of absolute benzene in a manner analogous to that described in Example 16, and the reaction solution was worked up accordingly. After recrystallization from ethanol, 40% of theory of the compound, M.P. 249–250° C., of the formula

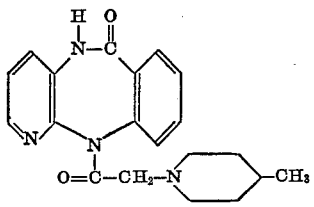

were obtained.
*Analysis.*—C₂₀H₂₂N₄O₂; mol. wt. 350.4. Calculated (percent): C, 68.80; H, 6.40; N, 16.10. Found (percent): C, 68.55; H, 6.33; N, 15.99.

Example 18.—5,11-dihydro-11-morpholinoacetyl-6H-pyrido[2,3-b][1,4]benzodiazepin-6-one 4.2 gm. of 11 - chloroacetyl - 5,11 - dihydro - 6H-pyrido[2,3-b][1,4]benzodiazepin - 6 - one and 15 ml. of morpholine were reacted in 200 ml. of absolute benzene in a manner analogous to that described in Example 16, and the reaction solution was worked up accordingly. After recrystallization from ethanol/ether, 35% of theory of the compound, M.P. 222° C. (decomp.), of the formula

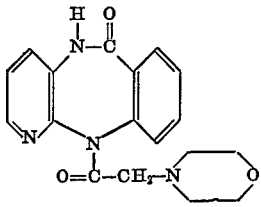

were obtained.
*Analysis.*—C₁₈H₁₈N₄O₃; mol. wt. 338.4. Calculated (percent): C, 63.89; H, 5.36; N, 16.56. Found (percent): C, 63.70; H, 5.43; N, 16.50.

Example 19.—5,11-dihydro-11-[(hexahydro-1'-azepinyl)-acetyl]-6H-pyrido[2,3-b][1,4]benzodiazepin-6-one Prepared from 11 - chloroacetyl - 5,11-dihydro-6H-pyrido[2,3-b][1,4]benzodiazepin-6-one and hexahydroazepine (hexamethyleneimine) in benzene, analogous to the manner described in Example 16. M.P. 207–209° C. (from ethanol). Yield: 70% of theory of the compound of the formula

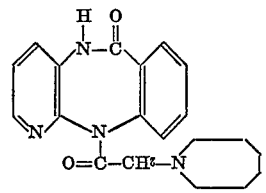

*Analysis.*—C₂₀H₂₂N₄O₂; mol. wt. 350.4. Calculated (percent): C, 68.55; H, 6.33; N, 15.99. Found (percent): C, 68.60; H, 6.86; N, 15.50.

Example 20.—11-camphidinoacetyl-5,11-dihydro-6H-pyrido[2,3-b][1,4]benzodiazepin-6-one Prepared from 11 - chloroacetyl - 5,11-dihydro-6H-pyrido[2,3-b][1,4]benzodiazepin - 6 - one and camphidine in benzine, in a manner analogous to that described in Example 16, M.P. 252–254° C. (from acetonitrile). Yield: 30% of theory of the compound of the formula

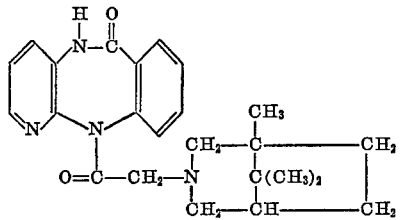

*Analysis.*—C₂₄H₂₈N₄O₂; mol. wt. 404.5. Calculated (percent): C, 71.26; H, 6.98; N, 13.85. Found (percent): C, 71.00; H, 6.86; N, 14.05.

Example 21.—5 - ethyl - 5,11-dihydro-11-[(4'-methyl-1'-piperazinyl) - acetyl] - 6H - pyrido[2,3-b][1,4]benzodiazepin-6-one Prepared from 5 - ethyl - 11-chloroacetyl-5,11-dihydro-6H-pyrido[2,3-b][1,4]benzodiazepin-6-one (prepared according to Example E) and N-methylpiperazine in absolute dioxane, in a manner analogous to that described in Example 9. After the reaction was finished, the mixture was evaporated in vacuo, the residue was dissolved in ammonia containing ethanol, and the solution was evaporated. The residue was recrystallized from acetonitrile. M.P. 174–175° C. Yield: 60% of theory.
*Analysis.*—C₂₁H₂₅N₅O₂; mol. wt. 379.5. Calculated (percent): C, 66.47; H, 6.64; N, 18.46. Found (percent): C, 66.50; H, 6.62; N, 18.40.

Example 22.—5,11 - dihydro - 8 - methyl-11-[(4'-methyl-1' - piperazinyl) - acetyl]-6H-pyrido[2,3-b][1,4]benzodiazepin-6-one Prepared from 11-chloroacetyl-5,11-dihydro-8-methyl-6H-pyrido[2,3-b][1,4]benzodiazepin-6-one (prepared according to Example F) and N-methylpiperazine in absolute dioxane, in a manner analogous to that described in Example 21. M.P. 236–237° C. (decomposition) after recrystallization from ethanol. Yield: 30% of theory.
*Analysis.*—C₂₀H₂₃N₅O₂; mol. wt. 365.4. Calculated (percent): C, 65.74; H, 6.34; N, 19.16. Found (percent): C, 66.00; H, 6.45; N, 18.80.

The monohydrochloride-semihydrate melted at 169–170° C. under decomposition (recrystallized from ethanol).

Example 23.—5,11-dihydro-11-[(4'-ethyl-1'-piperazinyl)-acetyl] - 6H-pyrido[2,3-b][1,4]benzodiazepin-6-one dihydrochloride Prepared from 11-chloroacetyl-5,11-dihydro-6H-pyrido[2,3-b][1,4]benzodiazepin-6-one and N-ethylpiperazine in absolute dioxane, in a manner analogous to that described in Example 21. Yield: 80% of theory. M.P. of the dihydrochloride: 253–254° C. (from isopropanol and a little hydrochloric acid) under decomposition.

*Analysis.*—Dihydrochloride: $C_{20}H_{25}Cl_2N_5O_2$; mol. wt. 438.4. Calculated (percent): C, 54.80; H, 5.75; N, 15.98; Cl, 16.18. Found (percent): C, 54.60; H, 5.85; N, 15.78; Cl, 15.85.

Example 24.—5,11 - dihydro-11-dimethylaminoacetyl-6H-pyrido[2,3-b][1,4]benzodiazepin-6-one hydrochloride A mixture of 5.8 gm. of 11-chloroacetyl-5,11-dihydro-6H-pyrido[2,3-b][1,4]benzodiazepin-6-one, 50 ml. of an aqueous 40% solution of dimethylamine, and 50 ml. of ethanol was stirred for eight hours at room temperature. After evaporating the reaction solution in vacuo, the residue was chromatographed in a silica gel column with chloroform and ethyl acetate (1:1). Subsequently, the column was eluted with methanol, and the eluate was evaporated. After adding ethereal hydrochloric acid to the residue, the hydrochloride precipitated which was recrystallized twice from ethanol/ethyl acetate (1:10). M.P.: 241–242° C. (decomp.); yield: 45% of theory.

*Analysis.*—$C_{16}H_{17}ClN_4O_2$; mol. wt. 332.8. Calculated (percent): Cl, 10.65. Found (percent): Cl, 10.81.

Example 25.—5,11-dihydro-11-dimethylaminoacetyl-5-methyl-6H-pyrido[2,3-b][1,4]benzodiazepin-6-one A mixture of 4.8 gm. of 11-chloroacetyl-5,11-dihydro-5 - methyl-6H-pyrido[2,3-b][1,4]benzodiazepin-6-one and 30 ml. of an aqueous 40% solution of dimethylamine in 30 ml. of acetone was stirred for eight hours at room temperature. The reaction solution was then worked up as described in Example 24. The hydrochloride was recrystallized from ethyl acetate/absolute ethanol (10:1). M.P. 251–252° C. (decomp.); yield: 55% of theory.

*Analysis.*—$C_{17}H_{19}ClN_4O_2$; mol. wt. 346.8. Calculated (percent): C, 58.88; H, 5.52; N, 16.15; Cl, 10.22. Found (percent): C, 58.90; H, 5.78; N, 15.98; Cl, 10.27.

Example 26.—5,11 - dihydro-11[(2'-methylpiperidino)-acetyl] - 6H - pyrido[2,3 - b][1,4]benzodiazepin-6-one 4.3 gm. of 11 - chloroacetyl - 5,11 - dihydro - 6H-pyrido[2,3-b][1,4]benzodiazepin - 6 - one and 15 ml. of 2-methylpiperidine were dissolved in 200 ml. of absolute benzene, and the solution was treated as described in Example 16. After recrystallization from absolute ethanol: M.P. 203–204° C.; yield: 45% of theory.

*Analysis.*—$C_{20}H_{22}N_4O_2$; mol. wt. 350.4. Calculated (percent): C, 68.55; H, 6.33; N, 15.99. Found (percent): C, 68.25; H, 6.34; N, 15.70.

Example 27.—5,11 - dihydro - 11 - [(3' - methylpiperidino)-acetyl] - 6H - pyrido[2,3-b][1,4]benzodiazepin-6-one 4.3 gm. of 11 - chloroacetyl-5,11-dihydro-6H-pyrido-[2,3-b][1,4]benzodiazepin-6-one and 15 ml. of 3-methyl-piperidine were dissolved in 200 ml. of absolute benzene, and the solution was treated as described in Example 16. The residue of the evaporated filtrate was triturated with water and recrystallized from acetonitrile. M.P.: 214–215° C.; yield: 58% of theory.

*Analysis.*—$C_{20}H_{22}N_4O_2$; mol. wt. 350.4. Calculated (percent): C, 68.55; H, 6.33; N, 15.99. Found (percent): C, 69.10; H, 6.14; N, 16.35.

Example 28.—5,11 - dihydro - 11 - [(2' - ethylpiperidino)-acetyl] - 6H - pyrido[2,3-b][1,4]benzodiazepin-6-one Prepared from 11 - chloroacetyl - 5,11 - dihydro - 6H-pyrido[2,3-b][1,4]benzodiazepin - 6 - one and 2-ethyl-piperidine in absolute benzene, analogous to the method described in Example 16. After recrystallization from isopropanol: M.P. 218–219° C.; yield: 62% of theory.

*Analysis.*—$C_{21}H_{24}N_4O_2$; mol. wt. 364.5. Calculated (percent): C, 69.21; H, 6.64; N, 15.37. Found (percent): C, 69.10; H, 6.65; N, 15.20.

Example 29.—5,11 - dihydro - 5 - methyl - 11 - [(2'-methylpiperidino)-acetyl] - 6H - pyrido[2,3-b][1,4]benzodiazepin-6-one Prepared from 11 - chloroacetyl - 5,11 - dihydro - 5-methyl - 6H - pyrido[2,3-b][1,4]benzodiazepin - 6 - one and 2-methylpiperidine in absolute benzene analogous to the method described in Example 27. After recrystallization from ethanol/absolute ether: M.P. 173–174° C.; yield: 68% of theory.

*Analysis.*—$C_{21}H_{24}N_4O_2$; mol. wt. 364.5. Calculated (percent): C, 69.21; H, 6.64; N, 15.37. Found (percent): C, 69.10; H, 6.74; N, 15.15.

Example 30.—5,11 - dihydro - 5 - methyl - 11 - [(4'-(o-methyl-benzyl) - 1' - piperazinyl)-acetyl] - 6H-pyrido[2,3-b][1,4]benzodiazepin-6-one Prepared from 11 - chloroacetyl - 5,11 - dihydro-5-methyl - 6H - pyrido[2,3-b][1,4]benzodiazepin - 6 - one and N-(2'-methylbenzyl)-piperazine in absolute benzene analogous to the method described in Example 16. M.P.: 191–192° C. (from ethanol); yield: 85% of theory.

*Analysis.*—$C_{27}H_{29}N_5O_2$; mol. wt. 455.6. Calculated (percent): C, 71.19; H, 6.42; N, 15.37. Found (percent): C, 71.30; H, 6.60; N, 15.35.

The compounds of the Formula I above and their non-toxic, pharmacologically acceptable acid addition salts have useful pharmacodynamic properties. More particularly, these compounds exhibit stomach ulcer inhibiting, stomach juice secretion inhibiting, antitussive and antiemetic activities in warm-blooded animals, such as rats.

For instance, the compounds 5,11-dihydro-11-[(4'-methyl-1'-piperazinyl)-acetyl]-6H-pyrido[2,3-b][1,4]benzodiazepin-6-one dihydrochloride, 5,11-dihydro-5-methyl-11-[(4'-methyl-1'-piperazinyl)-acetyl]-6H-pyrido[2,3-b][1,4]benzodiazepin-6-one dihydrochloride, 5,11-dihydro-11-[(4'-(o-methylbenzyl)-1'-piperazinyl)-acetyl]-6H-pyrido[2,3-b][1,4]benzodiazepin-6-one and 5,11-dihydro-11-[(1'-piperazinyl)-acetyl]-6H- pyrido[2,3-b][1,4]benzodiazepin-6-one dihydrochloride, when used in doses of 100 mg./kg., produce an inhibition of ulcer formation of 70% to 100% in rats, observed 22 hours after peroral administration. Atropine produces an approximately equal ulcer-inhibiting effect; the compounds according to this invention, however, are far superior to atropine, because they exhibit a certain symptomatic and organic specificity. Thus, the remaining anticholinergic properties and some of the undesirable side-effects (peristalsis-inhibiting effect on the intestines, accommodation disorder of the eyes, inhibition of saliva secretion) clearly recede. The spasmolytic action reaches, for instance, only $\frac{1}{15}$ to $\frac{1}{200}$ of the action of atropine sulfate against spasms induced by acetylcholine in the intestines of guinea-pigs.

The compounds mentioned above reduce the quantity of excreted gastric fluid at a dosage rate of 40 mg./kg. rat i.d. or i.p. by 50 to 90%, and they decrease the quantity of free hydrochloric acid released into the stomach and of the total hydrochloric acid in a significant manner.

The compounds 5,11 - dihydro - 11 - [(4' - methyl - 1'-piperazinyl)-acetyl] - 6H - pyrido[2,3-b][1,4]benzo-diazepin - 6 - one and 11 - (di-n-butylamino-acetyl) - 5,11-dihydro - 6H - pyrido[2,3-b][1,4]benzodiazepin-6-one, for instance, exhibit effective antitussive properties in awake white rats, superior to those of codeine.

Toxicity tests, carried out in white mice, resulted in peroral $LD_{50}$-values greater than 1500 mg./kg. 5,11-dihydro - 11 - [(4' - methyl - 1' - piperazinyl)-acetyl]-6H-pyrido[2,3-b][1,4]benzodiazepin - 6 - one dihydrochloride, for example, shows an $LD_{50}$-value of 3100 mg./kg. mouse p.o.

The inhibiting effect on the formation of stress-ulcers was tested by the method of G. Rossi, S. Bonfils et al., C. R. Soc. Biol. 150, 2124 (1956), in male FW 49-rats with a body weight of 140 to 150 gm. The rats, which had been fasted for 24 hours, were immobilized under ether-anesthesia by means of plaster bandages. The active ingredients were administered perorally five minutes before the anesthesia. Per compound 10 animals were used. The control animals received 1 ml. of a 0.9% physiological sodium chloride solution in the same manner. After 22 hours the rats were killed by ether-inhalation, the stomach was removed, it was opened by cutting along the great curvature and stretched open on a cork plate. The evaluation was carried out according to the method described in Med. Exp. 4, 284–292 (1961).

The effect on gastric fluid secretion was determined by the method of Shay et al, Gastroenterology 5, 43–61 (1945). The pylorus of fasted male rats of the FW-49-strain, weighing 140 to 150 gm., was tied off under Evipan-anesthesia (100 mg./kg. i.p.). The compounds were administered intraduodenally immediately after the pylorus ligature or intraperitoneally about 30 minutes or one hour after pylorus ligature in a dose of 40 mg./kg. Per compound 10 animals were used. The control animals received 0.25 ml. of a 0.9% physiological sodium chloride solution i.e. After five hours the rats were killed under ethylchloride anesthesia, the stomach was taken out, opened along the great curvature and the gastric fluid was collected. The free and the total hydrochloric acid content of the gastric fluid was determined by titration with N/50 sodium hydroxide solution.

The spasmolytic action was determined in vitro on the colon of the guinea-pig by the test procedure according to R. Magnus, Pflügers Archiv 102, 123 (1904). The spasms were induced with acetylcholine; the comparison compound was atropine sulfate. The spasmotic was added one minute before the addition of the spasmolytic, the time of action of the spasmolytic amounted to one minute.

The antitussive activity was determined according to the method of Engelhorn and Püschmann, Arzneimittelforschung 13, 474–480 (1963). Groups of 5 awake white rats were administered perorally 50 mg./kg. of active ingredient per animal. The cough was induced by inhalation of a 7.5%-citric acid spray.

The toxicity was determined after peroral administration of the compounds to fasted white mice of 18 to 20 gm. body weight, and the $LD_{50}$ was calculated according to Litchfield and Wilcoxon. The animals were observed for 14 days. For each dose a group of 5 to 10 mice was used.

For pharmaceutical purposes the compounds of the Formula I or their non-toxic acid addition salts are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective peroral dosage unit of the compounds according to the present invention is from 0.083 to 0.5 mgm./kg. body weight, preferably 0.166 to 0.34 mgm./kg. body weight. The daily dose rate is from 0.33 to 1.67 mgm./kg., preferably 0.5 to 1.0 mgm./kg.

The following examples illustrate a few pharmaceutical dosage unit compositions comprising a compound of the Formula I or a non-toxic acid addition salt as an active ingredient and represent the best modes contemplated of putting the invention into practical use. The parts are parts by weight unless otherwise specified.

Example 31.—Tables

The tablet composition was compounded from the following ingredients:

| | Parts |
|---|---|
| 5,11 - dihydro - 11 - [(4'-methyl-1'-piperazinyl)-acetyl] - 6H - pyrido[2,3 - b][1,4]benzodiazepin-6-one dihydrochloride | 10.0 |
| Lactose | 148.0 |
| Potato starch | 60.0 |
| Magnesium stearate | 2.0 |
| Total | 220.0 |

Compounding procedure: An aqueous 10% slurry was prepared with a portion of the potato starch by heating. The pyridobenzodiazepinone compound, the lactose and the remainder of the potato starch were intimately admixed with each other, and the mixture was granulated by moistening it with the slurry and forcing it through a 1.5 mm.-mesh screen. The granulate was dried at 45° C., again passed through the screen and admixed with the magnesium stearate, and the mixture was compressed into 220 mgm.-tablets. Each tablet contained 10.0 mgm. of the pyridobenzodiazepinone compound and was an oral dosage unit composition with very effective stomach ulcer inhibiting and stomach juice secretion inhibiting action.

Example 32.—Coated tablets

The tablets prepared pursuant to Example 31 were coated in conventional manner with a thin shell consisting essentially of talcum and sugar, and the coated tablets were polished with beeswax. The coated tablets produced the same therapeutic effect as the uncoated tablets of the preceding example.

Example 33.—Hypodermic solution

The solution was compounded from the following ingredients:

| | Parts |
|---|---|
| 5,11 - dihydro - 11 - [(4' - methyl-1'-piperazinyl)-acetyl] - 6H - pyrido[2,3-b][1,4]benzodiazepin-6-one dihydrochloride | 2.0 |
| Sodium chloride | 8.0 |
| Distilled water q.s.ad 1000.0 parts by vol. | |

Compounding procedure: The pyridobenzodiazepinone compound and the sodium chloride were dissolved in a sufficient amount of distilled water, the solution was diluted to the indicated volume with additional distilled water and then filtered until free from suspended particles, and the filtrate was filled into 1 cc.-amples which were then sealed and sterilized for 20 minutes at 120° C. Each ampule contained 2 mgm. of the pyridobenzodiazepinone compound, and the contents thereof were an intraduodenally or intraperitoneally injectable dosage unit composition with very effective stomach ulcer inhibiting and stomach juice secretion inhibiting action.

Example 34.—Suppositories

The suppository composition was compounded from the following ingredients:

| | Parts |
|---|---|
| 5,11 - dihydro - 11 - [(4'-methyl-1'-piperazinyl)-acetyl] - 6H-pyrido[2,3-b][1,4]benzodiazepin-6-one dihydrochloride | 15.0 |
| Cocoa butter | 1685.0 |
| Total | 1700.0 |

Compounding procedure: The finely pulverized pyridobenzodiazepinone compound was suspended with the aid of an immersion homogenizer in the cocoa butter which had been melted and cooled to 40° C. 1700 mgm.-portions of the homogeneous mixture were then poured into cooled suppository molds. Each suppository contained 15 mgm. of the pyridobenzodiazepinone compound and was a rectal dosage unit composition with very effective stomach ulcer inhibiting and stomach juice secretion inhibiting action.

Example 35.—Drop solution

The solution was compounded from the following ingredients:

| | Parts |
|---|---|
| 5,11 - dihydro - 11 - [(4'-methyl-1'-piperazinyl)-acetyl] - 6H - pyrido[2,3-b][1,4]benzodiazepin-6-one dihydrochloride | 1.0 |
| Methyl p-hydroxy-benzoate | 0.035 |
| Propyl p-hydroxy-benzoate | 0.015 |
| Anise oil | 0.05 |
| Menthol | 0.06 |
| Ethanol, pure | 10.00 |
| Sodium cyclamate | 1.00 |
| Glycerin | 15.00 |
| Distilled water q.s.ad 100.00 parts by vol. | |

Compounding procedures: The pyridobenzodiazepinone compound and the sodium cyclamate were dissolved in about 70 parts by volume of distilled water, and the glycerin was added to the solution. The p-hydroxy-benzoates, the oil of anise and the menthol were dissolved in the ethanol, and the resulting solution was stirred into the aqueous solution. Finally, the mixed solution was diluted to the indicated volume with distilled water and then filtered until free from suspended matter. 1 cc. (20 drops) of the filtrate contained 10 mgm. of the pyridobenzodiazepinone compound and was an oral dosage unit composition with very effective stomach ulcer inhibiting and stomach juice secretion inhibiting action.

A pharmaceutical dosage unit composition comprising a compound of the Formula I or a non-toxic acid addition salt thereof as an active ingredient may, in addition, also contain one effective dosage unit of one or more other active ingredients having different pharmacodynamic properties, such as sedatives, tranquilizers, local anesthetics, astringents, antacids or the like, as illustrated by the following examples:

Example 36.—Coated pills

The pill core composition was compounded from the following ingredients:

| | Parts |
|---|---|
| 5,11 - dihydro - 11 - [(4'-methyl-1'-piperazinyl)-acetyl] - 6H - pyrido[2,3-b][1,4]benzodiazepin-6-one dihydrochloride | 10.0 |
| Phenyl-ethyl-barbituric acid | 25.0 |
| Lactose | 50.0 |
| Cornstarch | 30.0 |
| Polyvinylpyrrolidone | 4.0 |
| Magnesium stearate | 1.0 |
| Total | 120.0 |

Compounding procedure: The pyridobenzodiazepinone compound, the barbituric acid compound, the lactose and the cornstarch were intimately admixed with each other, the mixture was granulated by moistening it with an ethanolic 10% solution of the polyvinylpyrrolidone and forcing the moist mass through a 1.5 mm.-mesh screen, the granulate was dried at 45° C. and again passed through a 1 mm.-mesh screen, the dry granulate was admixed with the magnesium stearate, and the mixture was compressed into 120 mgm.-pill cores which were then coated with a thin shell consisting essentially of talcum and sugar. The coated pills were finally polished with beeswax. Each coated pill contained 10.0 mgm. of the pyridobenzodiazepinone compound and 25.0 mgm. of the barbituric acid compound and was an oral dosage unit composition with very effective stomach ulcer inhibiting, stomach juice secretion inhibiting and sedative actions.

Example 37.—Coated pills

The pill core composition was compounded from the following ingredients:

| | Parts |
|---|---|
| 5,11 - dihydro - 11 - [(4'-methyl-1'-piperazinyl)-acetyl] - 6H - pyrido[2,3-b][1,4]benzodiazepin-6-one dihydrochloride | 10.0 |
| 2-diethylamino-2',6'-acetoxylidide | 50.0 |
| Lactose | 98.0 |
| Cornstarch | 50.0 |
| Polyvinylpyrrolidone | 10.0 |
| Magnesium stearate | 2.0 |
| Total | 220.0 |

Compounding procedure: The pyridobenzodiazepinone compound, the acetoxylidide compound, the lactose and the cornstarch were intimately admixed with each other, the mixture was granulated by moistening it with an ethanolic 20% solution of the polyvinylpyrrolidone and forcing the moist mass through a 1.5 mm.-mesh screen, the granulate was dried at 45° C. and again passed through the screen, the dry granulate was admixed with the magnesium stearate, and the mixture was compressed into 220 mgm.-pill cores which were then coated with a thin shell consisting of talcum and sugar. The coated pills were finally polished with beeswax. Each coated pill contained 10.0 mgm. of the pyridobenzodiazepinone compound and 50.0 mgm. of the acetoxylidide compound and was an oral dosage unit composition with very effective stomach ulcer inhibiting, stomach juice secretion inhibiting and local anesthetic actions.

Example 38.—Soluble powder

The powder was compounded from the following ingredients:

| | Parts |
|---|---|
| 5,11-dihydro-11-[(4' - methyl - 1' - piperazinyl)-acetyl] - 6H-pyrido[2,3-b][1,4]benzodiazepin-6-one dihydrochloride | 10.0 |
| Diacetyltannin albumin with 6% silver | 300.0 |
| Total | 310.0 |

Compounding procedure: The two ingredients were intimately admixed with each other, and 310 mgm.-portions of the mixture were filled into aluminum foil packages which were then sealed. Each package contained 10 mgm. of the pyridobenzodiazepinone compound and 300 mgm. of the diacetyltannin compound, and a solution of the contents thereof was an oral dosage unit composition with very effective stomach ulcer inhibiting, stomach juice secretion inhibiting and astringent actions.

Example 39.—Chewable tablet

The tablet composition was compounded from the following ingredients:

| | Parts |
|---|---|
| 5,11-dihydro-11-[(4' - methyl - 1' - piperazinyl)-acetyl]-6H - pyrido[2,3 - b][1,4]benzodiazepin-6-one dihydrochloride | 10.0 |
| Dimagnesium aluminum trisilicate | 500.0 |
| Skimmed milk powder | 300.0 |
| Mannitol | 113.0 |
| Vanillin, milled | 1.0 |
| Cocoa butter | 70.0 |
| Sodium cyclamate, milled | 1.0 |
| Magnesium stearate | 5.0 |
| Total | 1000.0 |

Compounding procedure: The pyridobenzodiazepinone compound, the dimagnesium aluminum trisilicate, the skimmed milk power and the mannitol were thoroughly admixed with each other, and the mixture was moistened first with an ethanolic 30% solution of the cocoa butter and then with 0.5 part of distilled water. The moist mass was forced through a 2.0 mm.-mesh screen, the resulting moist granulate was dried at 45° C., and the dry granulate was passed through a 1.5 mm.-screen and then intimately admixed with the remaining ingredients. The mixture was compressed into 1000 mgm.-tablets. Each chewable tablet contained 10 mgm. of the pyridobenzodiazepinone compound and 500 mgm. of the dimagnesium aluminum trisilicate, and was an oral dosage unit composition with very effective stomach ulcer inhibiting, stomach juice secretion inhibiting and antacid actions.

Analogous results were obtained when an equal amount of any one of the other compounds embraced by Formula I above or a non-toxic acid addition salt thereof was substituted for the particular pyridobenzodiazepinone compound in Examples 31 to 39. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to the illustrative embodiments and that various changes and modifications may be made without departing from the spirit of the invention or the scope of the appended claims.

We claim:
1. A pharmaceutical dosage unit composition consisting essentially of an inert pharmaceutical carrier and an effective stomach ulcer inhibiting and stomach juice secretion inhibiting amount of a compound of the formula

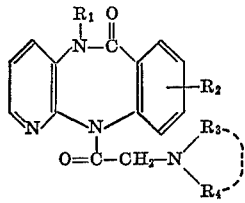

wherein $R_1$ is hydrogen or alkyl of 1 to 4 carbon atoms,
$R_2$ is hydrogen, chlorine or methyl, and
$R_3$ and $R_4$ are each alkyl of 1 to 5 carbon atoms, or together with each other and the nitrogen atom to which they are attached, camphidino, pyrrolidino, morpholino, piperidino, methyl-piperidino, ethyl-piperidino, piperazino, N'-methyl-piperazino, N'-ethyl-piperazino, N'-hydroxyethyl-piperazino, N' - benzyl - piperazino, N'-methylbenzyl-piperazino or hexamethyleneimino,
or a non-toxic, pharmacologically acceptable acid addition salt thereof.

2. The composition of claim 1, wherein said compound is 5,11-dihydro-11-[(4'-methyl-1'-piperazinyl)-acetyl]-6H-pyrido[2,3-b][1,4]benzodiazepin-6-one or a nontoxic, pharmacologically acceptable acid addition salt thereof.

3. The composition of claim 1, wherein said compound is 5,11-dihydro-5-methyl-11 - [(4'-methyl-1'-piperazinyl)-acetyl]-6H-pyrido[2,3-b][1,4]benzodiazepin-6-one or a non-toxic, pharmacologically acceptable acid addition salt thereof.

4. The composition of claim 1, wherein said compound is 11 - [(di-n-butylamino)-acetyl]-5,11-dihydro-6H-pyrido[2,3-b][1,4]benzodiazepin-6-one or a non-toxic, pharmacologically acceptable acid addition salt thereof.

5. The composition of claim 1, wherein said compound is 5,11-dihydro-11-[(4'-β-hydroxyethyl - 1' - piperazinyl)-acetyl]-6H-pyrido[2,3 - b][1,4]benzodiazepin-6-one or a non-toxic, pharmacologically acceptable acid addition salt thereof.

6. The composition of claim 1, wherein said compound is 5,11-dihydro-11-[(1'-piperazinyl) - acetyl]-6-H-pyrido[2,3-b][1,4]benzodiazepin-6-one or a non-toxic, pharmacologically acceptable acid addition salt thereof.

7. The composition of claim 1, wherein said compound is 5,11-dihydro-11-(dimethylamino - acetyl)-5-methyl-6H-pyrido[2,3-b][1,4]benzodiazepin - 6 - one or a non-toxic, pharmacologically acceptable acid addition salt thereof.

8. The composition of claim 1, wherein said compound is 5,11-dihydro-11-[(2'-methyl - piperidino)-acetyl]-6H-pyrido[2,3-b][1,4]benzodiazepin - 6 - one or a nontoxic, pharmacologically acceptable acid addition salt thereof.

9. The composition of claim 1, wherein said compound is 5,11-dihydro-11-[(2' - ethyl - piperidino)-acetyl]-6H-pyrido[2,3-b][1,4]benzodiazepin - 6 - one or a non-toxic, pharmacologically acceptable acid addition salt thereof.

10. The composition of claim 1, wherein said compound is 5,11-dihydro - 5 - methyl-11-[(2'-methyl-piperidino)-acetyl]-6H - pyrido[2,3 - b][1,4]benzodiazepin-6-one or a non-toxic, pharmacologically acceptable acid addition salt thereof.

11. The method of inhibiting the formation of stomach ulcers and the secretion of stomach juice in a warm-blooded animal, which comprises administering perorally or perenterally to said animal an effective amount of the composition of claim 1.

References Cited
UNITED STATES PATENTS
3,406,168   10/1968   Schmidt _____ 260—239.3

ALBERT T. MEYERS, Primary Examiner
F. E. WADDELL, Assistant Examiner

U.S. Cl. X.R.
424—244, 248, 263, 267